United States Patent [19]
Campbell et al.

[11] Patent Number: 5,484,340
[45] Date of Patent: Jan. 16, 1996

[54] UNIVERSAL MOUNT FOR A COMPRESSOR PRIME MOVER

[75] Inventors: Ross E. Campbell, Kings Mountain; Neville D. Kapadia, Huntersville, both of N.C.

[73] Assignee: Ingersoll-Rand Company, Woodcliff Lake, N.J.

[21] Appl. No.: 215,331

[22] Filed: Mar. 21, 1994

[51] Int. Cl.⁶ ............................. F16H 7/08; F04B 35/04
[52] U.S. Cl. ........................................... 474/101; 417/362
[58] Field of Search ...................... 474/101; 417/359, 417/362

[56] References Cited

U.S. PATENT DOCUMENTS

| | | | |
|---|---|---|---|
| 2,268,046 | 12/1941 | Marker et al. | 417/362 |
| 2,559,980 | 7/1951 | McAllister | 417/362 |
| 4,768,930 | 9/1988 | Grime | 417/362 |
| 5,022,827 | 6/1991 | Gangas | 417/362 X |
| 5,094,654 | 3/1992 | Strom | 474/101 |

*Primary Examiner*—Richard E. Gluck
*Attorney, Agent, or Firm*—Victor M. Genco, Jr.; Michael M. Gnibus

[57] ABSTRACT

An apparatus is provided for adjustably mounting a prime mover in belt driving relation to a reciprocating compressor to facilitate proper tensioning, locating and aligning of a reciprocating compressor drive belt. The apparatus includes a base plate and a support plate which mounts the prime mover. A pivotal mounting means, which defines an axis of rotation, is connected to the support plate. At least one pair of locators are fixedly attached to the base plate. The at least one pair of locators removably receive the pivotal mounting means to adjustably locate the support plate with respect to the base plate. A pivotal adjustment assembly adjustably positions the support plate in a predetermined position along an arcuately shaped path of travel about the axis of rotation.

4 Claims, 2 Drawing Sheets

UNIVERSAL MOUNT FOR A COMPRESSOR PRIME MOVER

BACKGROUND OF THE INVENTION

This invention generally relates to reciprocating compressors, and more particularly to a universal mount for flexibly adapting a belt-driven compressor to accommodate a range of adjustments which may be required to properly mount any one of a range of different sized prime movers in belt driving relation to the compressor.

Typically, reciprocating air compressors are belt driven by a prime mover, such as an electric motor or an engine. In these compressors, the prime mover mounts a drive pulley which drives a belt in force transmitting relation to a driven pulley, which is mounted on the compressor. In the repair and assembly of these type reciprocating compressors, proper belt tensioning is accomplished by adjusting the distance between the center of the drive pulley and the center of the driven pulley. This type adjustment is sometimes referred to as center distance adjustment.

To date, center distance adjustment has been accomplished by demounting the prime mover from the reciprocating compressor, re-positioning the prime mover in a predetermined belt tightening location, aligning the prime mover with respect to the compressor, and then remounting the prime mover to the compressor. This is a time consuming, laborious and tedious task. In extreme cases, additional parts may be required to accomplish this center distance adjustment procedure. Several iterations of center distance adjustment may be required to obtain an ideal setting with conventional arrangements.

The foregoing illustrates limitations known to exist in the present design of reciprocating compressors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a universal mount for use in combination with belt-driven machinery, such as but not limited to a reciprocating compressor. The universal mount includes a base plate having upper and lower surfaces. Formed in the upper surface of the base plate is an elongated channel. A support plate has first and second ends, and upper and lower surfaces. Formed through the support plate are a plurality of apertures for mounting and locating an article of interest. A pivotal mounting means is attached to the first end of the support plate. The pivotal mounting means defines an axis of rotation. At least one pair of locators is fixedly attached to the base plate for removably locating the pivotal mounting means. A pivotal adjustment means is provided for pivotally adjusting and automatically aligning a prime mover in belt driving relation with the machinery. The pivotal adjustment means has opposed first and second ends. The first end engages the support plate and the second end is slidable, into and out of predetermined locator engaging positions, in the elongated channel. The pivotal adjustment means locates the support plate in a predetermined position along an arcuately shaped path Of travel about the axis of its pivot. A retaining means retains the second end of the pivotal adjustment means within the elongated channel.

The apparatus of the present invention accommodates the mounting of a variety of different sized prime movers in belt driving relation to a machine, at varying center distances and belt tensions.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
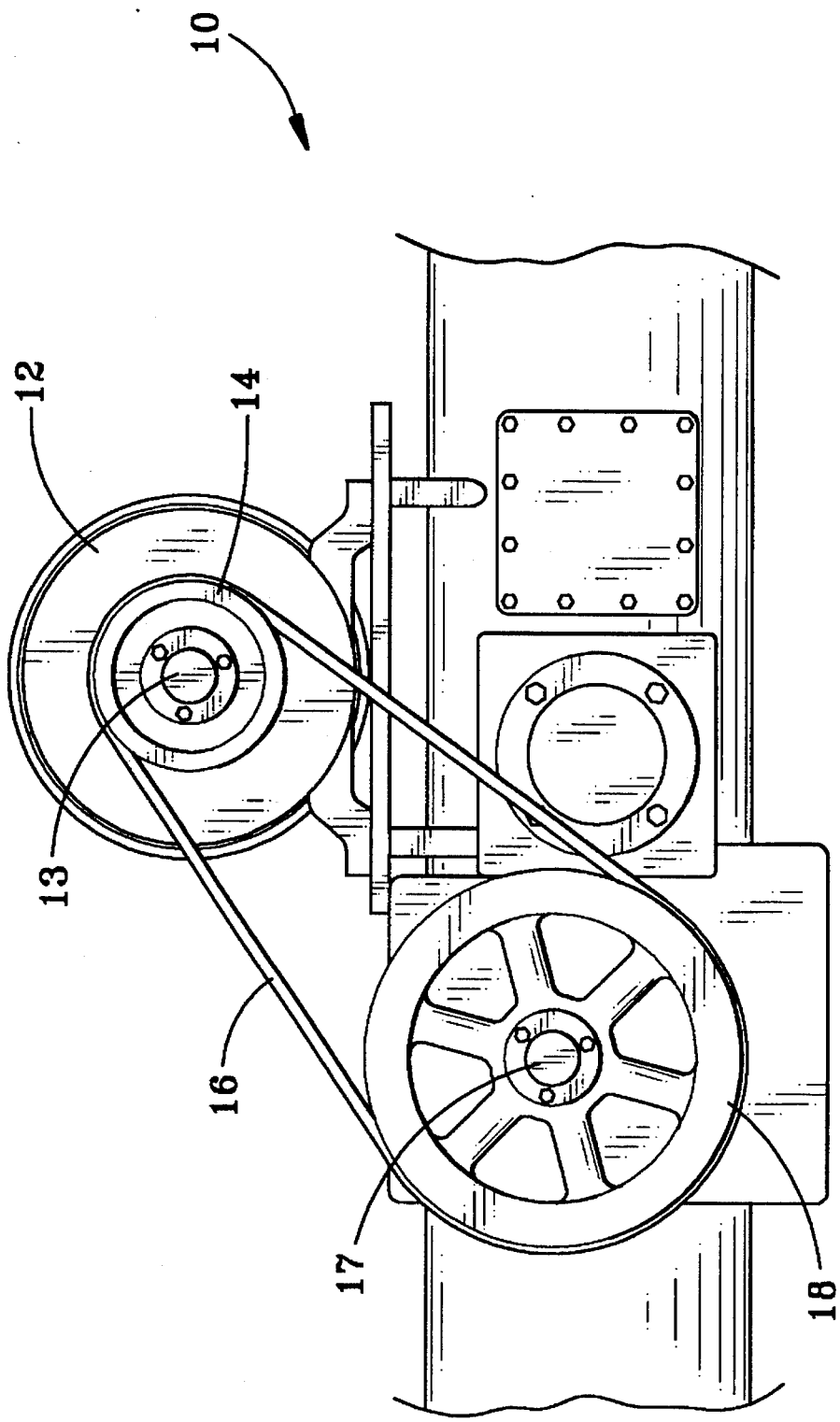
FIG. 1 is a partial view of a belt-driven reciprocating compressor having a prior art apparatus for mounting a belt driving prime mover.

Referring now to the drawings, FIG. 1 is a partial view of a belt-driven reciprocating compressor 10. The reciprocating compressor 10 is conventional in design, and includes a prime mover 12 which drives a shaft 13. The prime mover 12 is fixedly mounted on a base or slide rail as is well known in the art. Shaft 13 mounts a drive pulley 14. The prime mover 12, through the shaft 13 and the drive pulley 14, drives a drive belt 16 which is disposed in driving relation to the reciprocating compressor 10, as is well known in the art. The reciprocating compressor 10 includes a shaft portion 17 which mounts a driven pulley 18 which is disposed in force receiving relation to the prime mover 12.

The distance between shafts 13 and 17 is the drive center distance, or center distance of the reciprocating compressor 10. In the repair, assembly, maintenance or reconfiguration of the reciprocating compressor 10, proper tensioning of the belt 16 is accomplished by suitably adjusting this drive center distance. To date, this center distance adjustment has been accomplished by a combination of the following actions: using bases and slide rails of various sizes; demounting the prime mover 12 from the reciprocating compressor 10, re-positioning the prime mover in a predetermined belt-tightening location, aligning the prime mover with respect to the compressor; and remounting the prime mover in belt driving relation to the reciprocating compressor 10.

Figure 2:
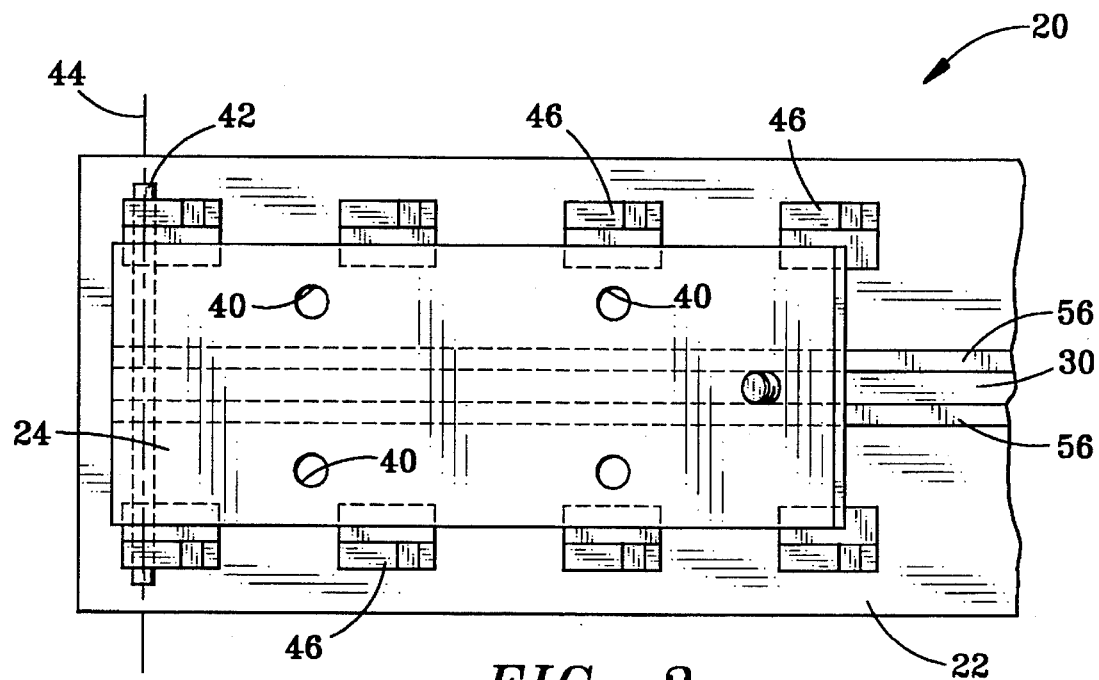
FIG. 2 is a plan view of the apparatus of the present invention.
Figure 3:
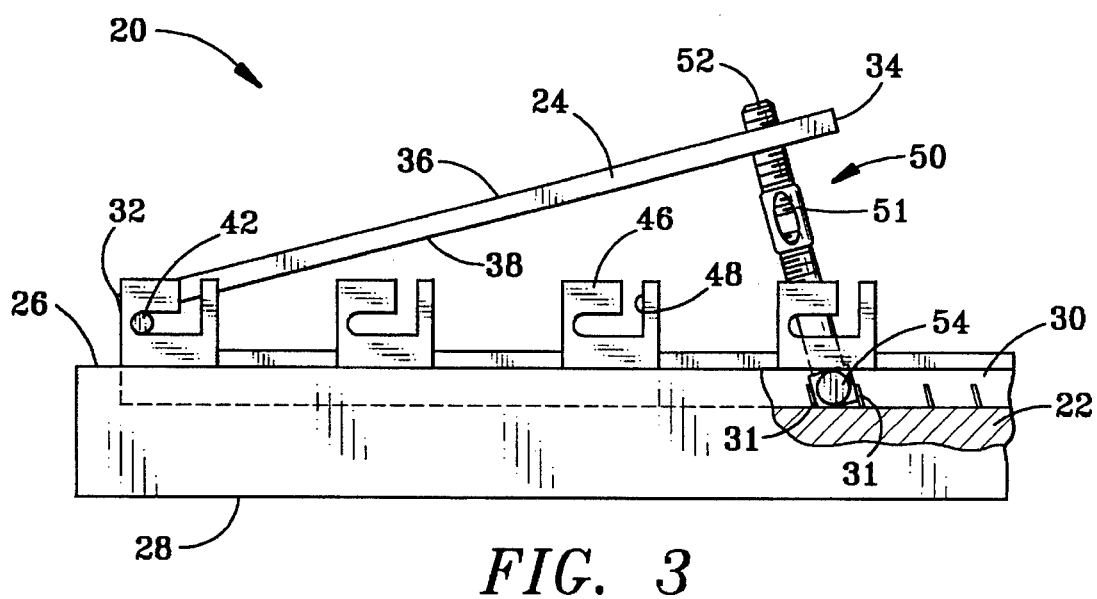
FIG. 3 is a side elevation view of the apparatus illustrated in FIG. 2.

FIGS. 2 and 3 illustrate an apparatus 20 which permits center distance adjustment without demounting the prime mover from the compressor 10, and without altering the alignment between the prime mover 12 and the reciprocating compressor 10.

The apparatus 20 of the present invention includes a base plate 22 and a support plate 24. The base plate is suitably, fixedly mounted to the reciprocating compressor 10, or to a common skid. The base plate 22 has an upper surface 26 and a lower surface 28. An elongated channel 30 is formed in the upper surface 26. Formed in the elongated channel, and at predetermined spaced intervals, are a plurality of locating tabs 31 which will be described in further detail hereinafter. The support plate has first and second ends, 32 and 34, respectively, and upper and lower surfaces, 36 and 38. Formed through the support plate are a plurality of apertures 40 for mounting and locating the belt driving prime mover 12. The apertures 40 are arranged in predetermined locations to align the prime mover 12 in proper belt driving relation with the compressor 10.

A pivotal mounting means 42, such as but not limited to a pin, dowel, or hinge assembly is fixedly attached to the first end 32 of the support plate 24. In the preferred embodiment, and as illustrated in FIGS. 2 and 3, the pivotal mounting means is a pin which defines an axis of rotation 44. A plurality of locators 46 are fixedly attached to the base 22. Each locator has a substantially L-shaped main body which has formed therein a slot 48 which removably mounts and aligns the pin 42. The locators 46 are arranged on the base 22 in pairs. More particularly, each locator 46 of a respective pair is disposed in parallel alignment, one to each other. Further, each locator of a respective pair is attached to the base 22 in a position on either side of the channel 30. As can be seen by reference to FIG. 2, each end of the pin 42 is supported by an individual locator of a respective pair. Each pair of locators is longitudinally arranged on the base 22 at predetermined spaced intervals, which are determined by known drive center distances for a variety of prime movers, such as a range of prime movers from 30 horsepower to 75 horsepower, for example.

A means for pivotally adjusting the support plate about the axis of rotation 44 is provided at 50. In the preferred embodiment, the pivotal adjustment means is a turnbuckle assembly having a threaded adjustor 51, and opposed first and second ends, 52 and 54, respectively. The first end 52 engages the support plate, and the second end 54 is slidable, into and out of predetermined locator engaging positions, in the elongated channel 30. More particularly, the second end 54 is removably received by a respective locating tab 31. The turnbuckle assembly adjustably locates the support plate 24 in a predetermined position along an arcuately shaped path of travel about the axis 44. The second end 54 is retained within the elongated channel 30 by any suitable method, such as by a pair of retaining plates 56, for example, which are fixedly attached to the upper surface 26 of the base 22 in partially occluding relation to the elongated channel 30.

In operation, the apparatus 20 of the present invention provides center distance adjustment between shafts 13 and 17 which thereby properly tensions the drive belt 16 for reciprocating compressor operation. In this regard, a prime mover 12 is mounted to the support plate 24 by way of threaded fasteners which are inserted through the respective grouping of mounting apertures 40. This ensures proper alignment of the prime mover 12 with the reciprocating compressor 10 during center distance adjustment. Thereafter, it is possible to accomplish center distance adjustment by any combination of the following: adjustably positioning the prime mover 12 with respect to the base plate 22 by slotting the support plate 24 into an appropriate locator pair 46; and/or tightening or loosening the turnbuckle assembly 50.

While this invention has been illustrated and described in accordance with a preferred embodiment, it is recognized that variations and changes may be made therein without departing from the invention as set forth in the following claims.

Having described the invention, what is claimed is:

1. An apparatus comprising:
   a machine driven by a belt;
   a prime mover for driving the belt; and
   mounting means for adjustably mounting the prime mover in belt tensioning and belt driving relation to the machine, the mounting means accomplishing the adjustable mounting of the prime mover while continuously locating the prime mover in belt driving alignment with the machine, the mounting means comprising,
   1) a base plate, having upper and lower surfaces, fixedly mounted to the machine, the upper surface having formed therein a channel;
   2) a support plate having first and second ends, and upper and lower surfaces, the support plate having formed therethrough a plurality of apertures arranged in predetermined locations for mounting the prime mover in belt driving alignment with the machine;
   3) pivotal mounting means attached to the first end of the support plate, the pivotal mounting means defining an axis of rotation;
   4) at least one pair of locators which are fixedly attached to the base plate, and which removably receive the pivotal mounting means to adjustably locate the support plate with respect to the base plate; and
   5) means for pivotally adjusting the support plate about the axis of rotation, the pivotal adjustment means having opposed first and second ends, and wherein the first end engages the support plate and the second end is slidable, into and out of predetermined positions, in the elongated channel.

2. An apparatus, as claimed in claim 1, for use in combination with a reciprocating compressor.

3. An apparatus, as claimed in claim 2, and wherein the pivotal adjustment means is a turnbuckle assembly.

4. In combination with a belt driven machine which is powered by a belt driving prime mover, an apparatus for adjustably mounting the prime mover in continuous belt driving alignment with the belt driven machine, the apparatus comprising:

a base plate fixedly mounted to the machine, the base plate having upper and lower surfaces, and wherein the upper surface has formed therein an elongated channel;

a support plate having first and second ends, and upper and lower surfaces, the support plate having formed therethrough a plurality of apertures arranged in predetermined locations for mounting the belt driving prime mover in belt driving alignment with the machine;

pivotal mounting means attached to the first end of the support plate, the pivotal mounting means defining an axis of rotation;

at least one pair of locators which are fixedly attached to the base plate, and which removably receive the pivotal mounting means to adjustably locate the support plate with respect to the base plate;

turnbuckle means for pivotally adjusting the support plate about the axis of rotation, the turnbuckle means having opposed first and second ends, and wherein the first end engages the support plate and the second end is slidable, into and out of predetermined positions, in the elongated channel;

retaining means for retaining the second end of the turnbuckle means within the elongated channel; and locating means for adjustably locating the second end of the turnbuckle means in a predetermined position within the elongated channel.

* * * * *